United States Patent
Koyama et al.

(10) Patent No.: US 9,471,592 B2
(45) Date of Patent: Oct. 18, 2016

(54) FILE MANAGEMENT SYSTEM, METHOD AND COMPUTER PROGRAM

(71) Applicants: Toshiaki Koyama, Kanagawa (JP); Toyoki Yamagishi, Yokohama (JP)

(72) Inventors: Toshiaki Koyama, Kanagawa (JP); Toyoki Yamagishi, Yokohama (JP)

(73) Assignee: Hitachi Information & Telecommunication Engineering, Ltd., Yokohama (JP)

( * ) Notice: Subject to any disclaimer, the term of this patent is extended or adjusted under 35 U.S.C. 154(b) by 250 days.

(21) Appl. No.: 14/102,862

(22) Filed: Dec. 11, 2013

(65) Prior Publication Data
US 2014/0164451 A1 Jun. 12, 2014

(30) Foreign Application Priority Data

Dec. 12, 2012 (JP) ................................. 2012-271417

(51) Int. Cl.
G06F 7/02 (2006.01)
G06F 17/30 (2006.01)
H04L 12/18 (2006.01)
H04M 3/42 (2006.01)

(52) U.S. Cl.
CPC ... G06F 17/30197 (2013.01); G06F 17/30247 (2013.01); G06F 17/30268 (2013.01); G06F 17/30749 (2013.01); H04L 12/1831 (2013.01); H04M 3/42221 (2013.01)

(58) Field of Classification Search
CPC .................. G06F 17/30247; G06F 17/30268; G06F 17/30749; G06F 17/3074; G06F 17/30781; G06F 17/30047; G06F 17/30787; G06F 17/30026
See application file for complete search history.

(56) References Cited

U.S. PATENT DOCUMENTS

| 6,226,412 | B1 * | 5/2001 | Schwab | G06Q 30/0605 348/E7.081 |
| 6,252,947 | B1 | 6/2001 | Diamond et al. | |
| 7,080,144 | B2 | 7/2006 | Boehmke | |
| 7,751,628 | B1 | 7/2010 | Reisman | |
| 8,509,477 | B2 | 8/2013 | Malone | |
| 2002/0035616 | A1 | 3/2002 | Diamond et al. | |
| 2003/0063770 | A1 * | 4/2003 | Svendsen | G06F 17/30206 382/100 |

(Continued)

FOREIGN PATENT DOCUMENTS

JP 2010-219734 A 9/2010
JP 2010219734 A 9/2010

OTHER PUBLICATIONS

European Search Report for European Patent Application No. 13005775.5-1862 mailed on Apr. 17, 2014.

(Continued)

Primary Examiner — Bruce Moser
(74) Attorney, Agent, or Firm — Brundidge & Stanger, P.C.

(57) ABSTRACT

A file management system that provide a record file rapidly to a terminal, request source, by saving a record file to a storage device set at the local area, and to make it possible to refer it. A first device creates the record file and attribute information indicating the attribute about the record file, stores the record file in a first storage unit, and transmits the attribute information to the second device through the network. A second device receives the attribute information and the record file transmitted from the first device and stores them in a second storage unit. The terminal requests to acquire the record file based on the acquired attribute information to the first device or the second device. The first device or the second device transmits the record file requested to the terminal.

13 Claims, 17 Drawing Sheets

(56) References Cited

U.S. PATENT DOCUMENTS

| | | |
|---|---|---|
| 2005/0289193 A1 | 12/2005 | Arrouye |
| 2006/0253505 A1 | 11/2006 | Natsume |
| 2011/0102854 A1* | 5/2011 | Cho ................. G06T 11/60 358/403 |
| 2011/0302113 A1 | 12/2011 | Smith |
| 2012/0143930 A1 | 6/2012 | Cho |
| 2013/0227015 A1 | 8/2013 | Mihara |
| 2013/0262596 A1* | 10/2013 | Srikrishna ......... G06F 17/30755 709/206 |
| 2014/0089353 A1* | 3/2014 | Koyama ........... G06F 17/30292 707/803 |
| 2014/0302826 A1* | 10/2014 | Naono ................ H04N 5/907 455/414.1 |

OTHER PUBLICATIONS

Office Action dated Sep. 15, 2015 for U.S. Appl. No. 14/036,467.
Office Action dated Apr. 12, 2016 for U.S. Appl. No. 14/036,467.

\* cited by examiner

FIG. 4

| ITEM NO. | 1 | 2 | 3 | 4 | 5 | 6 | 7 | 8 | 9 | 10 |
|---|---|---|---|---|---|---|---|---|---|---|
| ITEM NAME | RECORD FILE IDENTIFICATION ID | RECORD START TIME | RECORD END TIME | RECORD TIME | DESTINATION IP ADDRESS | SOURCE IP ADDRESS | RECORD FILE STORAGE LOCATION ADDRESS | CALL SOURCE TELEPHONE NUMBER | CALL DESTINATION TELEPHONE NUMBER | OUTCOMING/ INCOMING TYPE |

FIG. 5

| ITEM NO. | 1 | 2 | 3 | 4 | 5 | 6 | 7 | 8 | 9 | 10 |
|---|---|---|---|---|---|---|---|---|---|---|
| ITEM NAME | RECORD FILE IDNETIFICATION ID | RECORD START TIME | RECORD END TIME | RECORD TIME | DESTINATION IP ADDRESS | SOURCE IP ADDRESS | RECORD FILE STORAGE LOCATION ADDRESS | RECORD FILE RECEPTION FLAG | LOCAL CASH FLAG | LOCAL CASH STORAGE ADDRESS |
| | 11 | 12 | 13 | 14 | 15 | 16 | 17 | 18 | 19 | 20 | 21 |
| | CALL SOURCE TELEPHONE NUMBER | CALL DESTINATION TELEPHONE NUMBER | INCOMING/ OUTCOMING TYPE | CALLER OUTSIDE LINE TELEPHONE NUMBER | INCOMING OUTSIDE LINE TELEPHONE NUMBER | EXTENSION TELEPHONE NUMBER | OPERATOR ID | CUSTOMER IDENTIFICATION INFORMATION | COTRACT CONCLUSION FLAG | COMPLAINT FLAG | REFERENCE NUMER COUNTER |

FIG. 12

| TRANSFER START TIME OF RECORD FILE | RECORD PERIOD OF RECORD FILE | INCOMING TELEPHONE NUMBER | UPLOAD SUPPRESSION CONDITION | | |
|---|---|---|---|---|---|
| | | | CONTRACT CONCLUION FLAG | COMPLAINT FLAG | REFERENCE COUNTER |
| AM0:00 | MORE THAN ONE WEEK PASSING AFTER THE RECORD | NO DESIGNETED | "1" | "1" | MORE THAN TWO OR EQUAL |

FIG. 14

RECORD INFORMATION SEARCH

| OPERATOR ID : | | LEFT-HAND MATCH ▽ |
| EXTENSION NUMBER : | | LEFT-HAND MATCH ▽ |
| OUTSIDE LINE NUMBER : | | LEFT-HAND MATCH ▽ |
| INCOMMING NUMBER : | | LEFT-HAND MATCH ▽ |
| IP ADDRESS : | | LEFT-HAND MATCH ▽ |
| RECORD FILE ID : | | LEFT-HAND MATCH ▽ |
| RECORD START TIME : | | TO |
| RECORD END TIME : | | TO |
| CUSTOMER NAME : | | LEFT-HAND MATCH ▽ |

CONTRACTED OR NOT : ◎
COMPLAINED OR NOT : ◎

( SEARCH EXECUTION )    ( CANCEL )

FIG. 15

RECORD INFORMATION SEARCH RESULT

| DELETION FLAG | REFER-ENCE FLAG | RECORD START TIME | RECORD END TIME | RECORD TIME | RECORD FILE ID | EXTEN-SION NUMBER | OPERATOR ID | ... |
|---|---|---|---|---|---|---|---|---|
| ☐ | ☐ | | | | | | | |
| ☐ | ☐ | | | | | | | |
| ............ | | | | | | | | |
| ☐ | ☐ | | | | | | | |
| ☐ | ☐ | | | | | | | |

( EXECUTION )

FIG. 17

| ITEM NO. | 1 | 2 | 3 | 4 | 5 | 6 | 7 | 8 | 9 | 10 |
|---|---|---|---|---|---|---|---|---|---|---|
| ITEM NAME | IMAGE FILE IDNETIFICATION ID | RECORD START TIME | RECORD END TIME | RECORD TIME | AUTHENTI-CATION REQUEST TIME | AUTHENTI-CATION END TIME | RECORD FILE STORAGE LOCATION ADDRESS | RECORD FILE RECEPTION FLAG | LOCAL CASH FLAG | LOCAL CASH STORAGE ADDRESS |

| 11 | 12 | 13 | 14 | 15 |
|---|---|---|---|---|
| DOOR ID | ID CARD NUMBER | AUTHENTICATION RESULT | CARD USER NAME | REFERNCE NUMBER COUNTER |

FILE MANAGEMENT SYSTEM, METHOD AND COMPUTER PROGRAM

BACKGROUND OF THE INVENTION

1. Field of the Invention

The present invention relates to a file management system, method and a computer program, and more particularly relates to the retention and management of telephone call record files generated in a call center and an office and files of images captured by a monitor camera and so forth.

2. Description of the Related Art

The files of telephone call records (voices) occurring in the call center, the office of a sales department or the like, or the files of images of persons, background video images and so forth captured by a monitor camera and so forth (hereinafter, referred to as a "record file" or "record files") are retained in a file management device as records incidental to various activities. For example, when the record file of telephone calls is to be retained and managed, information relating to specification of a phone number (or information such as an IP address or the like with which a connecting destination is identified), date and time of acquisition (that the file has been acquired), or a place of acquisition, such as the information of identifying an object to be acquired, information on a situation upon acquisition and so forth are retained in the file management device as attribute information by relating them to the record file concerned. In general, the record file is stored in a storage in the file management device and the attribute information is stored in a database which is under the control of the file management device by being related to the storage, that is, a storage location that the record file has been stored. The attribute information is used by searching the database later when the record file is to be referred to or as required.

It is desirable to install the storage at a secure location, that is, the storage of the record file is in a place such as a data center or the like where the files are readily managed collectively from the viewpoint of insuring security. Therefore, it becomes inevitable to transmit the record files from the call center (having a file collection device) that collects the record files to the file management device installed in a remote location over a network.

As related art of this kind, for example, in Japanese Patent Laid-Open No. 2010-219734, there is described a telephone call records central management system where voice files and attribute files of the voice files generated in offices which are decentralized such as sales offices, branch offices and so forth are transmitted to a central management server over a network such as a WAN (Wide Area Network) or the like and are registered in the database of the central management server so as to unitarily manage them.

However, since the capacity of the record file is large, such a disadvantage occurs that in a method that every time one record file is created on the side of the file collection device, the record file is transferred to the file management device, an amount of the network bandwidth to be used for file transfer is large and a delay is induced in transfer of other pieces of data which are high in priority. For measures, in which the transfer of record files occurs, there is conceivable a method of transferring the record files collectively in a time zone where room in the network bandwidth is available such as in the nighttime. Therefore, in the file collection device, we can think of a method of retaining collected record files in a storage until they are transmitted to the file management device and transmitting the record files to the file management device when there is room in the network.

In the unitary telephone call records central management system described in Japanese Patent laid-Open No. 2010-219734, if the record files and their attribute files which are collected and retained by a local server are collectively transferred from the local server to a central management server by utilizing a time zone that there is room in the network, the load which is imposed on the network for file transfer will be reduced. However, since many record files and attribute files are retained in the local servers in the decentralized offices until the record files and the attribute files are transferred to and collectively retained in the central management server, it is difficult to refer to them unitarily.

As a solution to the above-mentioned disadvantage, there is also conceivable, for example, a method that every time one record file is acquired by each local server, the record file is transferred to the central management server. However, in this method, since the frequency of file transfer in the on-duty time zone in the daytime that many record files are acquired is high it is difficult to transfer the files by selecting a time zone where the network load is small. Furthermore, there is a demand that searches can be conducted over a wide area by using attribute information, and that a desired record file can be obtained rapidly.

SUMMARY OF THE INVENTION

The present invention aims to provide a low cost and easy to use file management system which manages a record file made in a local area and attribute information thereof.

In addition, the present invention aims to transfer a record file generated in a local area to a center based on a transfer condition of the record file according to a user's desire.

Further, the present invention aims to provide a record file rapidly to a terminal, request source, by saving the record file to a storage device set at the local area, and to make it possible to refer to the file.

A file management system according to an embodiment of the present invention is preferably a file management system that transmits a record file of voice data or image data which is created by a first device to a second device over a network, manages the record file in the second device, and the record file can be referred according to a request from a terminal, wherein the first device:

creates the record file including the voice data or the image data, creates an attribute information indicating the attribute about the record file, stores the record file associated with information identifying the record file in a first storage unit, and transmits the attribute information including identification information about the record file to the second device through the network;

wherein the second device:

receives the attribute information transmitted from the first device through the network, stores management information including the attribute information in a second storage unit, further receives the record file transmitted from the first device through the network, stores the record file in the second storage unit, and transmits the attribute information included in management information according to a request from a terminal; and wherein the terminal transmits the request to acquire the record file based on the acquired attribute information to the first device or the second device, and wherein the first device or the second device received the request to acquire the record file read the record file from the first storage unit or the second storage unit, and transmit to the terminal.

The present invention further provides a file management system comprising the second device, a file management method as to the file management system, and a computer readable medium having stored therein a file management program executed on servers composed of the first device and the second device.

BRIEF DESCRIPTION OF THE DRAWINGS

FIG. 4 is a diagram illustrating a format configuration example of an attribute file in one embodiment of the present invention;

FIG. 5 is a diagram illustrating a configuration example of a management table for attribute information in one embodiment of the present invention;

FIG. 12 is a diagram illustrating an example of a transfer control condition table according to the third embodiment of the present invention;

FIG. 14 is a diagram illustrating a search screen of record information according to the fourth embodiment of the present invention in a terminal;

FIG. 15 is a diagram illustrating a search result screen of record information according to the fourth embodiment of the present invention in a terminal;

FIG. 17 is a diagram illustrating a configuration of a management table of attribute information according to the fifth embodiment of the present invention.

DETAILED DESCRIPTION OF THE PREFERRED EMBODIMENTS

In the following, preferred embodiments of the present invention will be described in detail with reference to the accompanying drawings.

First Embodiment

Figure 1:
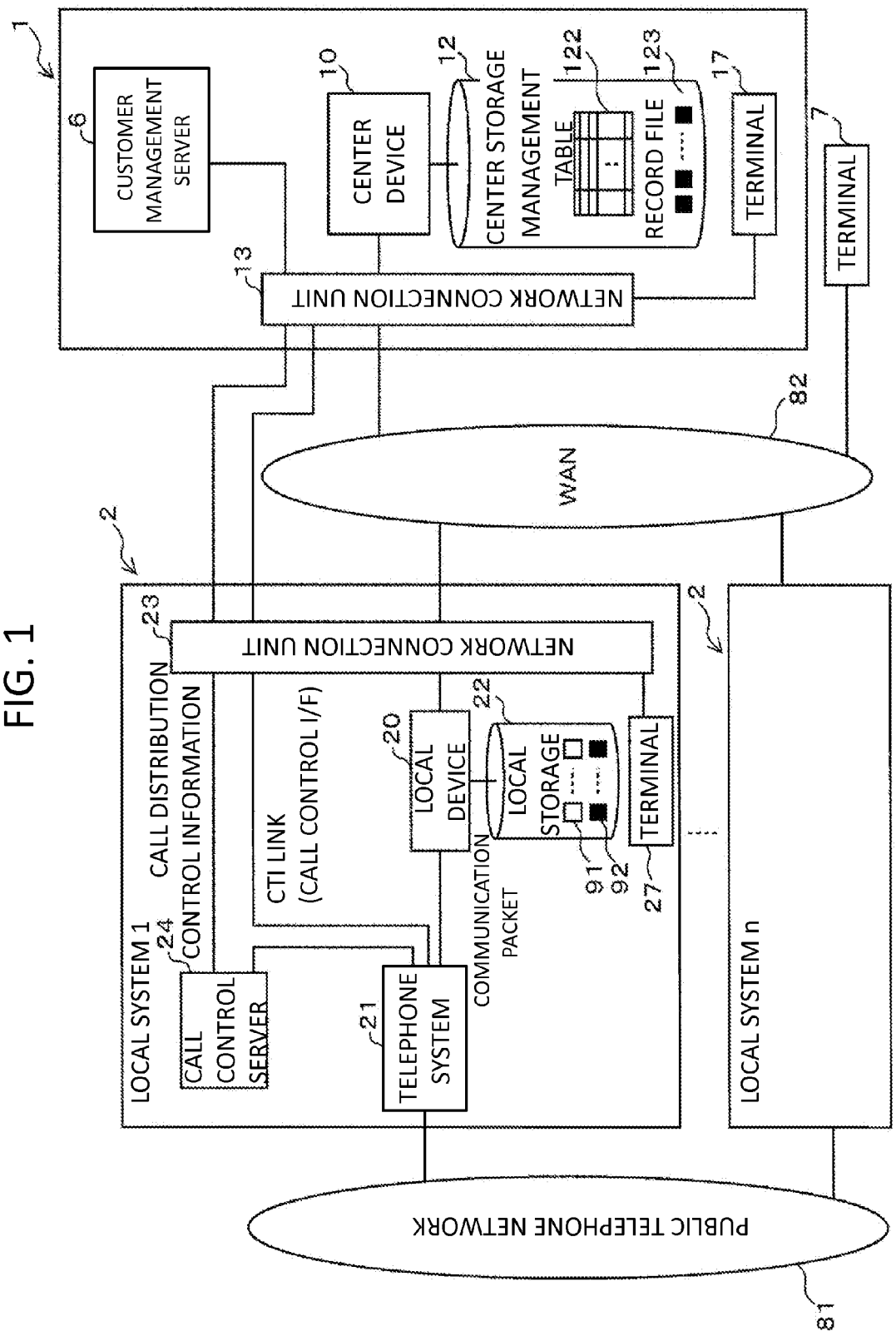
FIG. 1 is a diagram illustrating a configuration example of a record file management system according to one embodiment of the present invention.

FIG. 1 illustrates a configuration example of a record file management system according to one embodiment.

The first embodiment is applied to a contact center management system that telephone call record files (hereinafter, simply referred to as "a record file" or "record files") generated in a call center or centers located in one or a plurality of local places are transferred to a management device installed in the center and retained in the center.

In one base or a plurality of bases where a call center/call centers is/are located, there is/are formed one or a plurality of local system(s) 2 each including a telephone system 21 which is connected to a public telephone network 81. One or the plurality of local system (s) is/are connected to a center system 1 over a network 82 such as the WAN or the like. A terminal 7 used for monitoring an operating status or the like of an operator terminal of the telephone system 21 and for referring to record files (described later) is connected to the WAN 82 in some cases.

In the local system 2, the telephone system 21 includes an IP-PBX (Internet Protocol Private Branch Exchange) which is connected to the public telephone network 81 and the operator terminal that performs reception of a telephone call which is received through the IP-PBX. The local system 2 further includes a local device 20, a local storage 22, a network connection unit 23 which is connected to the WAN 82 and a terminal 27 which is connected to the network connection unit 23.

A call control server 24 acquires and manages call control information (incoming call of telephones, source telephone number, destination telephone number etc.) transmitted and received between a PBX of the telephone system 21 and inner telephones therein through CTI link (Interface (I/F) for call control), information of operator operating a terminal in the telephone system 21, condition information of the telephone system 21, and information of the terminal.

The local device 20 is configured, for example, by a server device and acquires a telephone call packet (for example, an RTP (Real-time Transport Protocol) packet) which is transmitted and received between the IP-PBX of the telephone system 21 and an internal telephone set, and creates a record file 92 on the basis of the packet, and further acquires attribute information used for managing the record file 92 and creates an attribute file 91. The record file 92 and attribute file 91 so created are temporarily stored in the local storage 22 and are then transmitted to the center system 1. (A detailed configuration of the local device 20 will be described later with reference to FIG. 2.)

The record files 92 which have been temporarily stored in the local storage 22 are then collectively transmitted to the center system 1 in a predetermined time zone (that is, a time period in the nighttime when the network load is small) and are retained in a storage 12 of the center system 1 and managed. (A description will be made later with respect to this point.)

The terminal 27 is a terminal for a manager that includes an input device, a display, a processor and memory such as a personal computer (PC) and is allowed to monitor the operating status of the operator terminal and to refer to the record file 92 which has been created in the above-mentioned manner. Although the record files 92 and attribute files 91 thereof which have been created by the local devices 20 are record files 92 to be unitarily managed by the center system 1, they are retained in the local storage 22 until a transfer request to the center system 1 comes as one feature of the present embodiment. When the transfer request comes, it is allowed to readout the record file 92 which has been stored in the local storage 22 and to supply the read-out record file 92 to the terminal 27 in accordance with a request from the terminal 27 within the local system 2. Since the terminal 27 is allowed to readily acquire the record file 92 within the local system 2 without using the WAN 82, a reduction in line cost of the network is allowed.

Here, the record file 92 and attribute file 91 thereof will be described. The record file 92 is a file of voices of a telephone call transmitted and received between a caller and an operator, that is, a file of voices made, for example, for a purchase order, service request and change, a complaint, confirmation of the contents of a contract from a customer and so forth. Attribute information which would be created as the attribute file 91 is information which is characteristic to the telephone call (that is, the record file 92) and includes a start time and a finish time of the telephone call transmitted and received between the operator and the caller, a source IP address (a port IP address on the extension side of the PBX), a destination IP address (an IP address of an extension telephone) and so forth. Here, we call the attribute information "basic attribute information". (A configuration of the attribute file 91 will be described later with reference to FIG. 4.)

Next, the center system 1 includes a center device 10, a center storage 12, a network connection unit 13 which is connected to the WAN 82 and a terminal 17 which is connected to the network connection unit 23. The center device 10 is connected to a customer management server 6 through a network connection unit 13. The customer management server 6 is a server to manage the business operations and customer information of, for example, insurance companies, mail order companies and so forth, and the center system 1 and plural local systems 2 corresponding to the insurance companies, mail order companies is for supporting the call center of them.

The center device 10 is for example, a server device (a detailed configuration thereof will be described later with reference to FIG. 3), and mainly performs a process of retaining the record files 92 and the attribute files 91 which have been collected from the local systems 2 and a process of supplying the record file 92 which is retained in accordance with a request from the terminal 7, 17, and 27.

The center storage 12 stores a management table 122 for managing attribute information that the attribute files 91 indicates and record files 123 (the same as the files 92) which are collected from the respective local systems 2. A configuration of the management table 122 will be described later with reference to FIG. 5.

The terminals 7 and 17 are terminals also for the manager such as the personal computers (PCs) similarly to the terminal 27, and used to monitor the operating status of the operator terminal and to refer to the record file 123 stored in the center storage 12.

Figure 2:
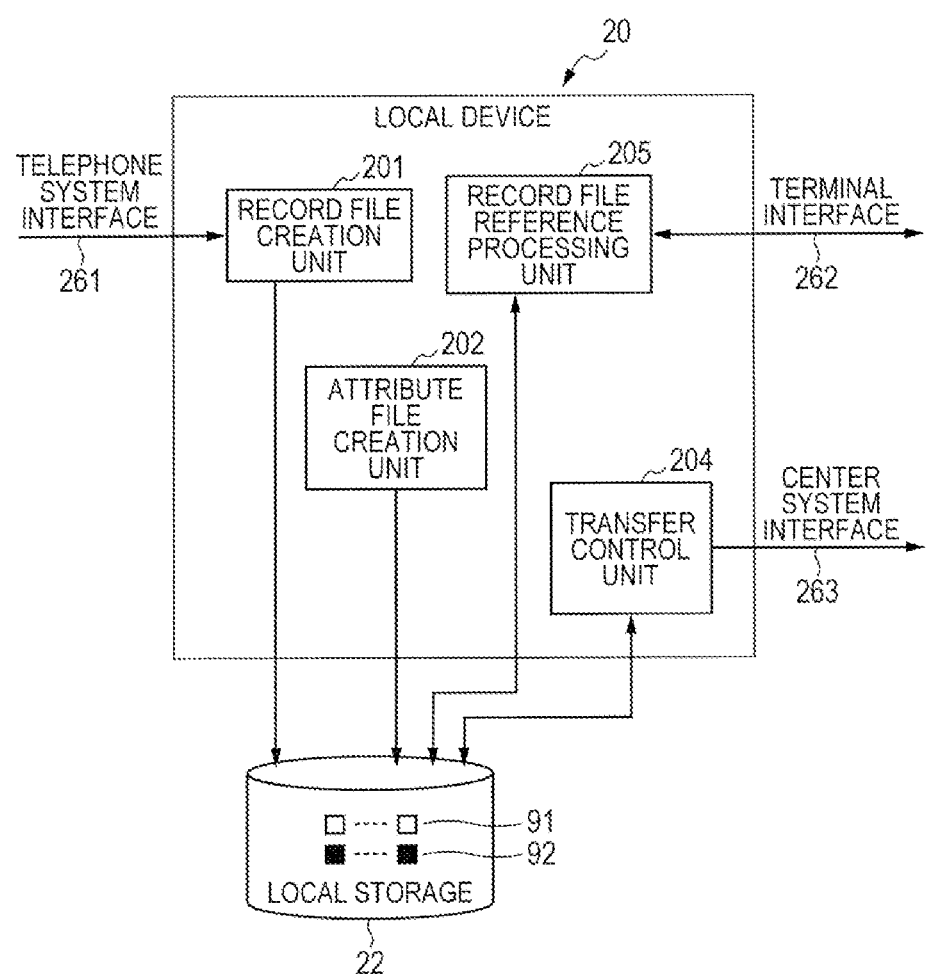
FIG. 2 a diagram illustrating a configuration example of a local device in the record file management system according to one embodiment of the present invention.

FIG. 2 illustrates a configuration example of the local device 20.

The local device 20 includes a record file creation unit 201 for acquiring a telephone call packet from an interface 261 of the telephone system 21 and creating a record file 92, an attribute file creation unit 202 for creating an attribute file 91 which includes attribute information (refer to FIG. 4) such as a record start time and finish time, recipient information and so forth upon creation of the record file 92, a transfer control unit 204 for controlling transfer of the attribute file 91 and the record file 92 to the center device 10 via an interface 263, and a record file reference processing unit 205 for reading out the record file 92 stored in the local storage 22 in accordance with an access request from the terminal via an interface 262.

Although a hardware configuration of the local device 20 is not illustrated, the local device 20 includes a processor for executing a program, a memory or memories for storing data and the program which is expected to be executed by the processor and so forth. Functions of the above-mentioned respective units are implemented by executing the program on the processor.

The local storage 22 stores the record file 92 which has been created by the record file creation unit 201 and the attribute file 91 which has been created by the attribute file creation unit 202 and corresponds to the record file 92. Incidentally, although, in FIG. 2, the local storage 22 for storing the attribute file 91 and the corresponding record file 92 is illustrated on the outer side of the local device 20, the local storage 22 may be contained in the local device 20. Furthermore, although, in FIG. 2, the local storage 22 for storing the attribute file 91 and the corresponding record file 92 is illustrated that they are stored in the same local storage 22, they may be stored in different local storages 22 respectively.

Figure 3:
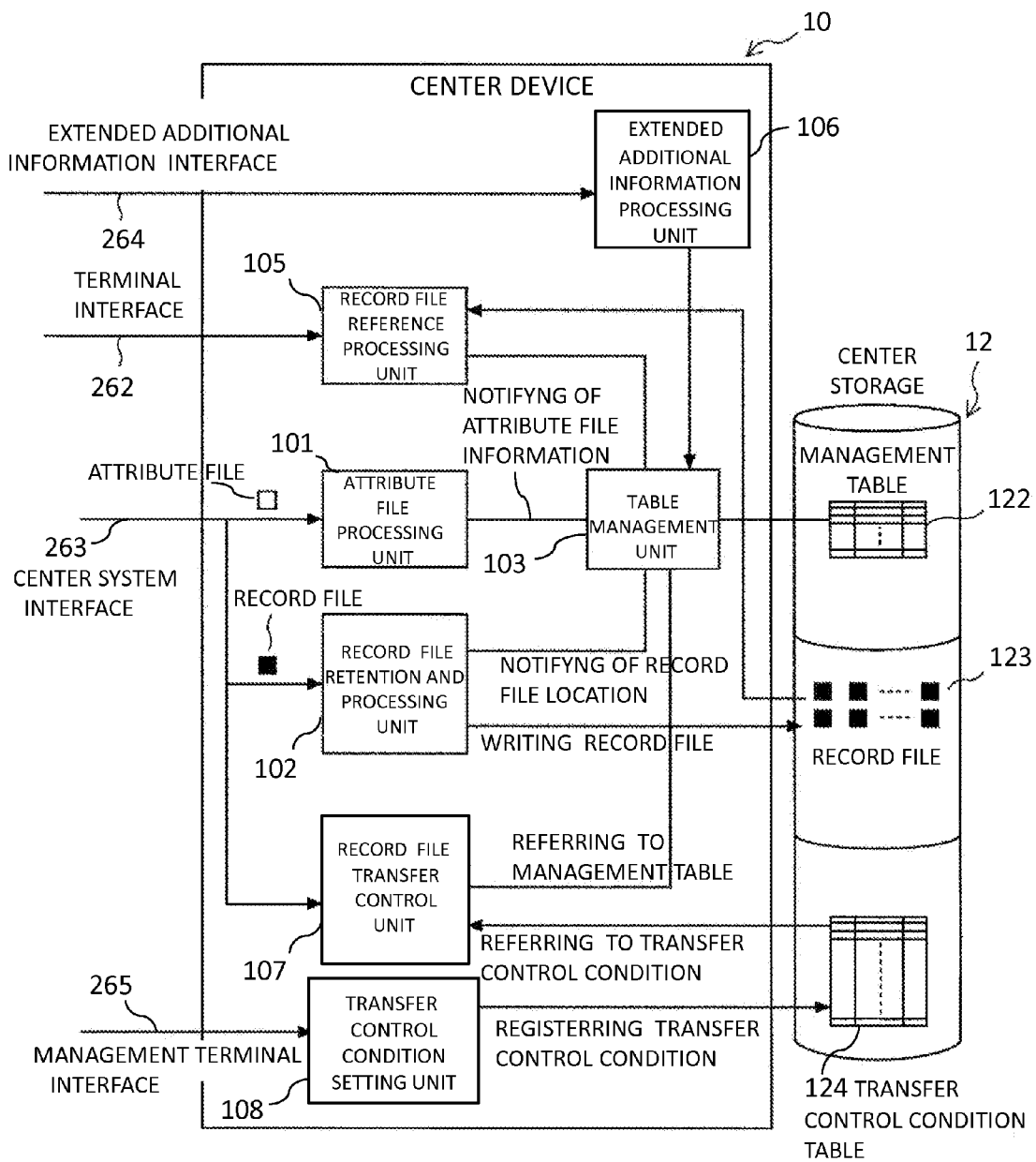
FIG. 3 is a diagram illustrating a configuration example of a center device in the record file management system according to one embodiment of the present invention.

FIG. 3 illustrates a configuration example of the center device 10.

The center device 10 includes an attribute file processing unit 101 for performing a process of extracting information to be retained in the management table 122 from the received attribute file 91 and a process of updating the contents of the management table by relating the contents to the record file identification ID, a record file retention and management unit 102 for storing the received record file 123 in the center storage 12, a table management unit 103 for writing and reading out information into and from the management table 122 which is stored in the center storage 12, a record file reference processing unit 105 for searching the management table 122 and reading out the record file 123 stored in the center storage 12 in accordance with a reference request from the terminal 17, an extended additional information processing unit 106 for acquiring an added information associated with basic attribute information of record files (called "extended additional information") from the IP-PBX, call control server 24, or customer management server 6 and processing the extended additional information, and a file transfer control unit for controlling transfer (sometimes called "upload") of the record files from the local system 2 to the center system 1, and a transfer control condition setting unit 108 for processing registration of transfer condition specified from a record file transfer control unit 107 and the terminal 17, to a transfer control condition table 124.

Although a hardware configuration of the center device 10 is not illustrated, the center device 10 includes a processor for executing a program, a memory or memories for storing data and the program which is expected to be executed by the processor and so forth. Functions of the above-mentioned respective units are implemented by executing the program on the processor.

Incidentally, although, in FIG. 3, the center storage 12 for storing the management table 122 and the corresponding record file 123 is illustrated on the outer side of the center device 10, the center storage 12 may be contained in the center device 10. Furthermore, although, in FIG. 3, the center storage 12 for storing the management table 122 and the corresponding record file 123 is illustrated that they are stored in the same center storage 12, they may be stored in different center storages 12 respectively.

The center storage 12 stores the management table 122 composed of each entry as a management file which is associated basic attribute information (a first attribute information) acquired from the local system 2 and extended attribute information (a second attribute information) included in an attribute file 91 with the record file 123, the many record files 123 transferred from the local system 2 and acquired, and the transfer control condition table 124 specifying upload transfer condition of the record file 123. The transfer condition stored in the transfer control condition table 124 is parameters used at the time when the upload transfer of the record file 123 is executed. (The matter will be described later). The data in the transfer control condition table 124 can be set and changed through the management terminal interface 265 of the terminal 17 and transfer control condition setting unit 108. Incidentally, although the management terminal interface 265 is the same as the terminal interface 262 in physical view, we have illustrated different things in the logical view that the management terminal interface 265 should be distinguished as the meaning that it is exclusive interface for an administrator. Incidentally, a configuration of the management table 122 and will be described later with reference to FIG. 5 and FIG. 12 respectively.

The attribute file 91 transmitted from the local device 20 is processed by the attribute file processing unit 101 and information which is desirable for an updating process in the table management unit 103 is sent to the table management unit 103. Thus, the contents of the management table 122 are updated. That is, an entry of new management information added one by one. In the present embodiment, in attribute information composing one entry of the management file 122, the basic attribute information is included in the attribute file 91 transferred from the local system 2, and the extended attribute information (numbers in FIG. 5, #14-20) is acquired from a PBX or the call control server 24, the customer management server 6. Incidentally acquiring processing for the management information will be later with reference to FIGS. 6-9.

When receiving the record file 123, the record file retention and management unit 102 stores the record file 123 to the center storage 12. At the same time, the address of the record file 123 is transmitted to the table management unit 103 because update of the stored place information of the record file 123 in the management table 122 is needed. The table management unit 103 rewrites the record file reception flag from not received "0" to received "1". When, from the terminal 17 (or 7), occurring the referring request for the record files 123 stored (or which may be stored) in the center storage 12, the record file reference processing unit 105 receives the request, the table management unit 103 performs searching process of the management table 122, and notifies the terminal 17 (or 7) of the result. As a result of referring the reception flag of the management table 122, when the record file 123 which is the target for the referring request is stored in the center storage (the record reception flag: "1"), the table management unit 103 reads the target record file 123, and transmits it to the terminal 17 (or 7). To the contrary, as a result of referring the reception flag of the management table 122, when the record file 123 which is the target for the referring request is not stored in the center storage (the record reception flag: "0"), the table management unit 103 refers to "the stored place address of the record file" in the management table 122, and transmits a read instruction for the record file to the local storage 22 in the local system 2, which is indicated by said stored place address of the record file.

FIG. 4 illustrates a format configuration example of an attribute file.

The attribute file 91 includes each information such as an identification ID for identifying a record file 92 concerned, a record start time (year-month-day-hour-minute-second) indicating the time that recording of a telephone call with the caller via the telephone system 21 is started, a record finish time (year-month-day-hour-minute-second) indicating the time that recording is finished, a record time (hour-minute-second), a source IP address (a port IP address on the extension side of the PBX) of the record file and a destination IP address (an IP address of an extension telephone), a storage location address indicating the storage location of the record file concerned, a call source telephone number indicating an extension telephone number of a call source, a call destination telephone number indicating an outside line telephone number or extension telephone number of a call destination, an outcoming/incoming type indicating whether call from a telephone is outcoming or incoming.

Here, the source IP address and the destination IP address are acquired from a header field of a telephone call packet outside line telephone number concerned. In addition, the storage location address is an address (for example, a local device address and directory information in the local storage concerned) of the local device that the record file concerned is stored). Further, the call source telephone number or the call destination telephone number are acquired in the way that the system monitors the packet for call control, or acquires information which the telephone system 21 keeps through a CTI link.

FIG. 5 illustrates a configuration example of a management table for attribute information.

The management table 122 is composed of each entry, an identification ID for identifying the record file concerned, a record start time indicating the time that recording of the telephone call with the caller via the telephone system 21 is started, a record finish time indicating the time that recording is finished, a record time, a source IP address (the port IP address on the extension side of the PBX) of the record file and the destination IP address (the IP address of the extension telephone) of the record file, a storage location address indicating the storage location of the record file concerned, a record file reception flag indicating the reception of the record file finishes in the center system 1, a local cash flag indicating the record flag remains in the local storage, a storage location address of the local cash used when the record file is stored as cash, a call source telephone number, a call destination telephone number, an outcoming/incoming type, a caller outside line telephone number, an incoming (outside line) telephone number, an extension telephone number, an operator id for identifying an operator who operates in the telephone system 21 in the call center, a customer identification information (customer name) uniquely given to each customer of a service company whose business is dealing with customers in the call center, a contract conclusion flag indicating the content of telephone call is the conclusion of the contract with the customer, a complaint flag indicating the content of a customer's call is a complaint, a reference number counter indicating a cumulative number at which the terminal refers to corresponding management information of management table 122.

Here, item number #8, the reception flag is the flag indicating whether reception of the record file corresponding to entry information already registered in management table 122 is finished or not. And when received, it is indicated with "1", while when not received, it is indicated with "0".

With respect to the source of acquisition of management information, information of item numbers #1-7, #11-13 is acquired from the attribute file, and information of item numbers #14-20 (extended additional information) is acquired from the attribute file from a PBX or the call control server 24, the customer management server 6 by the extended additional information processing unit through an extended additional information interface 264.

Incidentally, when there are plural local systems, a management table 122 is set to each of local systems, respectively, each of management tables 122 is given to a local system ID for identifying with each local system. For another aspect of the system configuration, the plural management tables 122 may compose a single table.

At the terminal 17, an administrator refers to management information registered in management table 122 for analysis, so that he can use it for analysis of customers and service quality. (Incidentally, referring processing for management information will be described with reference to FIGS. 14 and 15.)

Furthermore, the record file 92 whose reference times are large in the local system 2 is used as cash, and left in local storage after the transfer of the record file finishes. And the center system 1 manages the situation, so that the administrator can refer to and use said record file rapidly stored in the local storage 22 without transferring said record file from the center storage 12 through a WAN, when a reference request for said record file occurs from the terminal 27 in the local system 2.

Second Embodiment

Transfer and Retention of the Attribute File and the Record File

The transfer of information between the local system 2 and the center system 1 mainly includes the processing (phase 1) to transfer to the center system the attribute file composed of attribute information (we call it "a first attribute information") indicating the attribute of the record file made in the local device 20 and register the attribute file to the management table, the processing (phase 2) to acquire extended additional information (we call it "a second attribute information") added on the first attribute information corresponding to the record file and register the extended additional information to management table, and the processing (phase 3) to transfer the record file stored in the local storage 22 to center system and store in the center storage 12.

Figure 6:
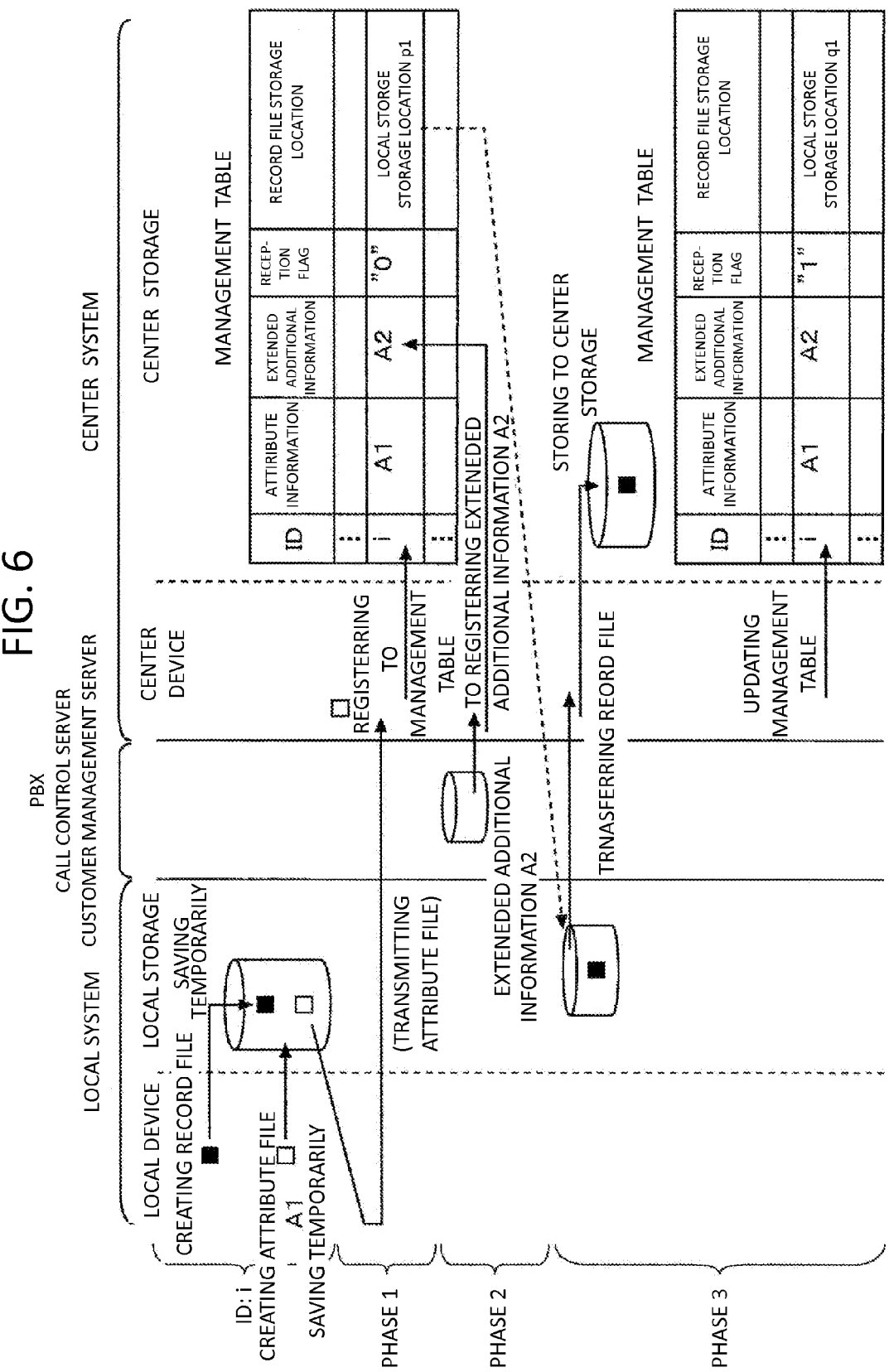
FIG. 6 is a sequence diagram illustrating an example of a series of operations of transferring from a local system to a center system and retaining record files in one embodiment of the present invention.

First, with reference to FIG. 6, we describe the whole processing of transferring the attribute information and the record file from the local system 2 and the center system 1, and of storing them. And then, with reference to FIGS. 7-9, we describe the processing of acquiring the second attribute file and of registering (Second Embodiment), further, with reference to FIGS. 10-13, describe the control processing of transferring of the record file (Third Embodiment).

<The Processing of Transfer of the Attribute Information, of Acquisition of the Extended Additional Information, and of Registering (Phase 1 and 2)>

(Phase 1)

With reference to FIG. 6, the local device 20 acquires a voice packet from the interface 261 to a telephone system, the record file creation unit 201 creates a record file 92, and the attribute creation unit 201 creates an attribute file 91 (refer to FIG. 4) including the attribute information of the record file. The created record file 92 and attribute file 91 thereof are stored in the local storage 22.

Here, the file creation unit 202 generates unique information (record file ID) to identify record files, and gives it to the record file. The record file 92 are given the record file ID and stored in the local storage 22. Further, the attribute file creation unit 202 records "i" to the record file ID in the attribute file A1, creates the attribute file recorded the address of the local storage 22 "p1" to the record file location address, and stores the attribute file in the local storage 22.

The transfer control unit 204 transfers the attribute file A1 made as above mentioned to the center system 1 through the center system interface 263. This action is performed at every time whenever a new record file is made.

At the center storage 10 in the center system 1, the attribute file processing unit 101 transfers management information to be written to the management table 122 based on the received the attribute file. As to the example, the record file ID is "i", the reception flag is not received "0" because the record file has not yet received. The made management information is written to items, item numbers #1-#7, and #11-#13 in the management table 122 by the table management unit 103.

(Phase 2)

Next, the system switches to the processing of phase 2. The processing of phase 2 is the phase that the center system 1 acquires the second attribute information A2 related to the record file from a PBX or the call control server, the customer management server, and registered to the management table. As to these, we describe with reference to FIGS. 7-9.

Figure 7:
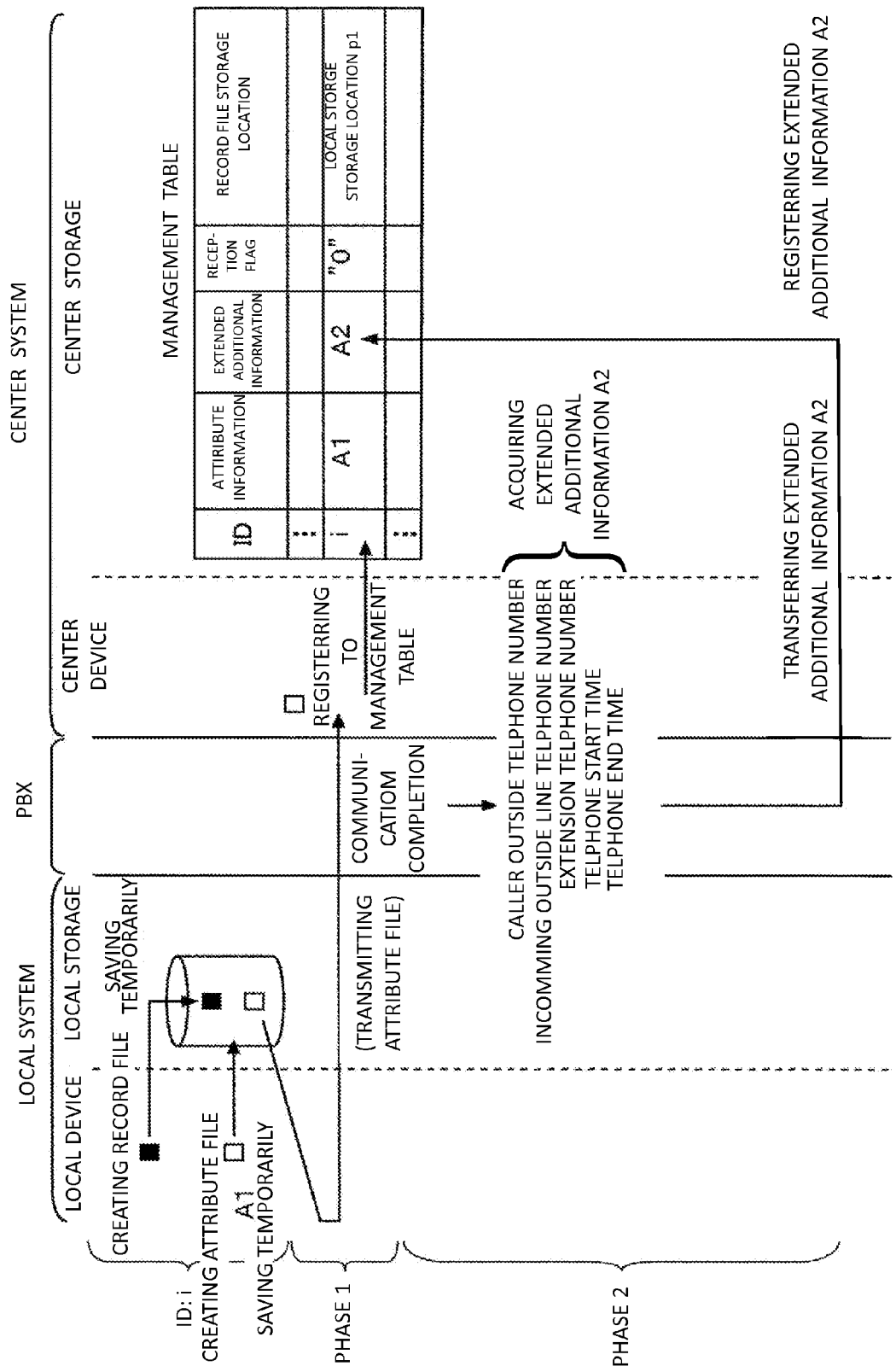
FIG. 7 is a sequence diagram illustrating an example of an operation of acquiring an extended additional information according to the second embodiment of the present invention.

As shown in FIG. 7, at the timing of completion of telephone communication, the center system 1 acquires the second attribute information A2 related to the record file, like the caller outside line telephone number, the incoming outside line telephone number, and the extension telephone number, from a PBX or the call control server, the customer management server, and registers to the item numbers #14-16 of the management table. As to these information, the extended additional information processing unit 106 of the center device 10 acquires the information kept by the telephone system 21 through the network connection unit 13, the extended additional information interface 264, the WAN 82, and the network connection unit 23 in the local system 2. Incidentally, when, in the telephone system 21, the local device can monitor and analyze the call control packet from the PBX, it may acquire the above mentioned information without using the CTI link in some cases.

And then the table management unit 103 searches the information of the management table 122, decides consistency between the acquired extended additional information and the already acquired the first attribute information, so that it registers the acquired additional information at the places of the items corresponding to the first attribute information. As to the decision of the consistency, the table management unit 103 decides it on the basis upon whether each of the destination and transmission source IP addresses of the packet for calling agrees or not based on the time of start and end of the telephone call.

Figure 8:
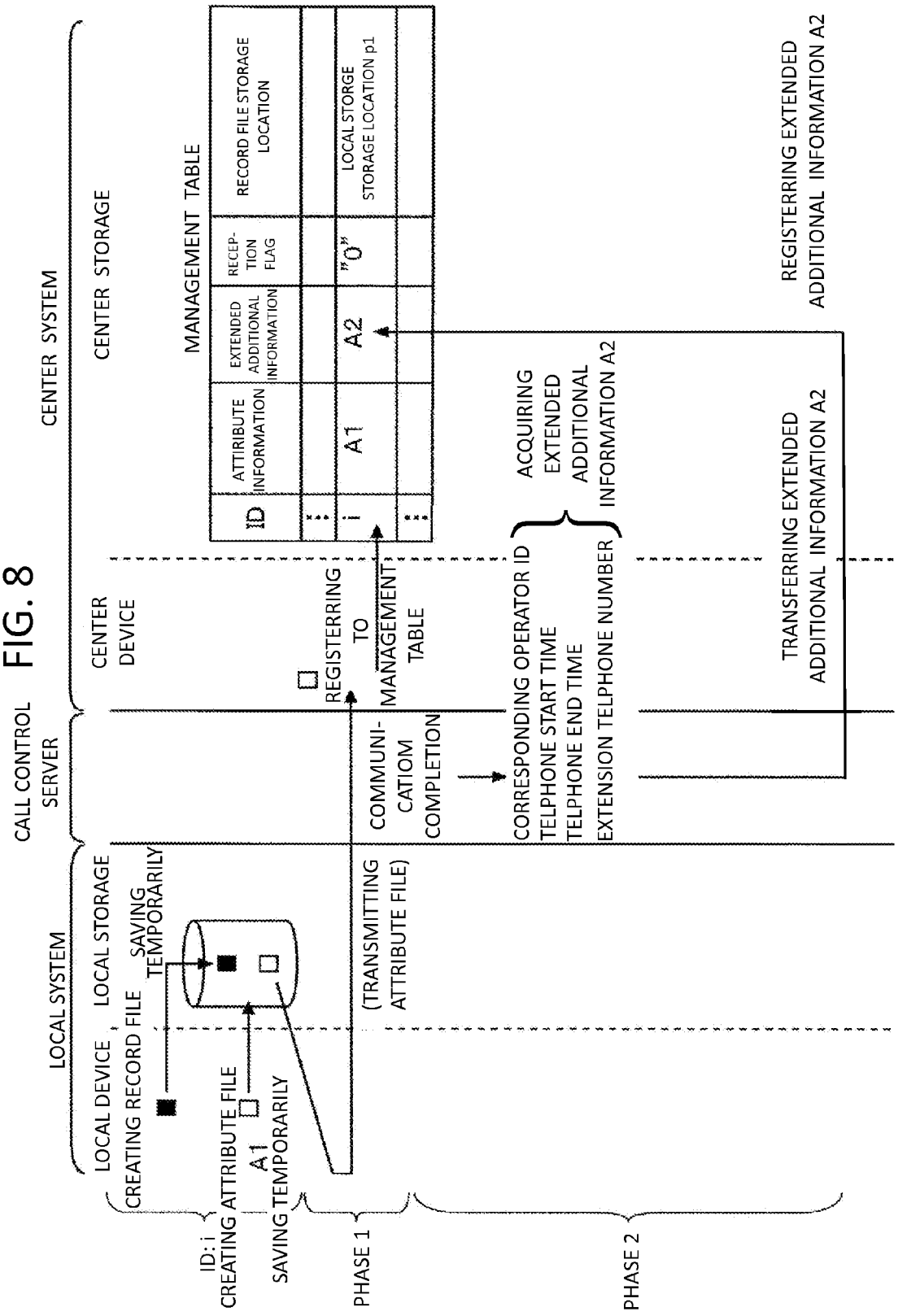
FIG. 8 is a sequence diagram illustrating an example of an operation of acquiring an extended additional information according to the second embodiment of the present invention.

Next, as shown in FIG. 8, at the timing of completion of telephone communication, the center system 1 acquires the operator ID corresponding to the telephone number from the call control serve 24. To describe in detail, the extended additional information processing unit 106 acquires as one of the information included in the call attribution control information through the network connection unit 13, the extended additional information interface 264, the WAN 82, and the network connection unit 23 in the local system 2. Incidentally, the decision of the consistency between this extended information (operator ID) and the above mentioned first attribute information is performed on whether each of the telephone numbers agrees or not based on the time of start and end of the telephone call.

Figure 9:
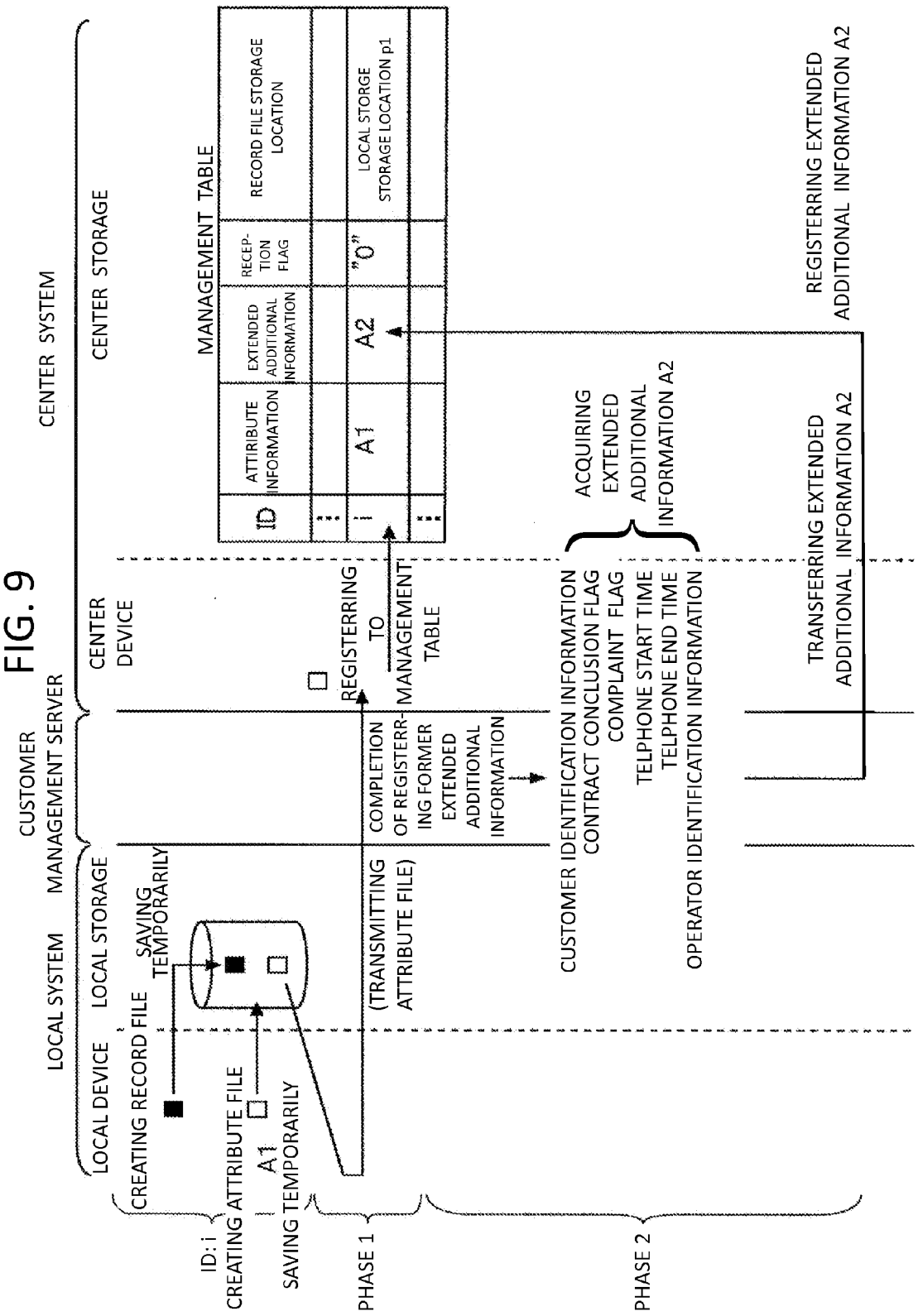
FIG. 9 is a sequence diagram illustrating an example of an operation of acquiring an extended additional information according to the second embodiment of the present invention.

Next, after recording the extended attribute information corresponding to the operator ID, as shown in FIG. 9, the extended additional information processing unit 106 of the center device acquires information such as customer identification information, the contract conclusion flag, the complaint flag, and registered them to the item numbers #18-20 in the management table. The customer management server 6 manages personal information such as customer's name, address, contact address (telephone number or E-mail address etc.), age, and job, or customer's information such as the content of the contract (current status) etc. with the start and end time of serving the customer, and the operator ID, so that the decision of the consistency between the above acquired first attribute information and the above mentioned information acquired by the customer management server 6 is performed on the basis of whether each of the operator Ids whose operator serves the customer at the time agrees or not based on the time of start and end of the telephone call. Thus, the attribute file A1 of the first attribute information for a record file and the second attribute information A2, the extended additional information related to the first attribute information are collected, and one entry of the management information corresponding to said record file (record file ID) is formed in the management table. At this stage, the system keeps the condition that the record file is retained in each of local storages 22 in the local system 2, and the center system 1 has not yet received the record file (#8 record file reception flag: "0"). Further, the record file storage location address #7 is the local storage location address "p1". Moreover, the local cash flag #9 and the local cash storage location address is unregistered.

These operations of phase 1 and phase 2 as above mentioned are repeated at each time when each record file is created.

Thus, the first attribute information that the local system 2 makes based on the packet for using call acquired from the telephone system directly is not only collected but also information including the second information related to the first attribute information, which the extended additional information processing unit 105 of the center device 10 acquires. This management information is, after that, used for the search based on various information included in the management information, so that an administrator can acquire the record file by the search in wide view using various information. By listening to the record file, the result of the search, the administrator cab confirm the conversation between the operator and the customer, or the reception on the business, and monitor. These matters are profitable for arrangement of operators, business management, or customer management.

Alternative Example

Incidentally, an attribute file is transmitted to the center system 1 by the attribute file creation unit 202 at each time when the attribute file creation unit 202 creates the attribute file. However, according to an alternative example, created record files is stored temporarily, after that and at every time after a lapse of a certain time (for example, one hour), the local system may transmit in a math together the plural created record files stored in the local storage 22 to the center system.

Third Embodiment

Transfer Control of the Record File (Phase 3)

Figure 10:
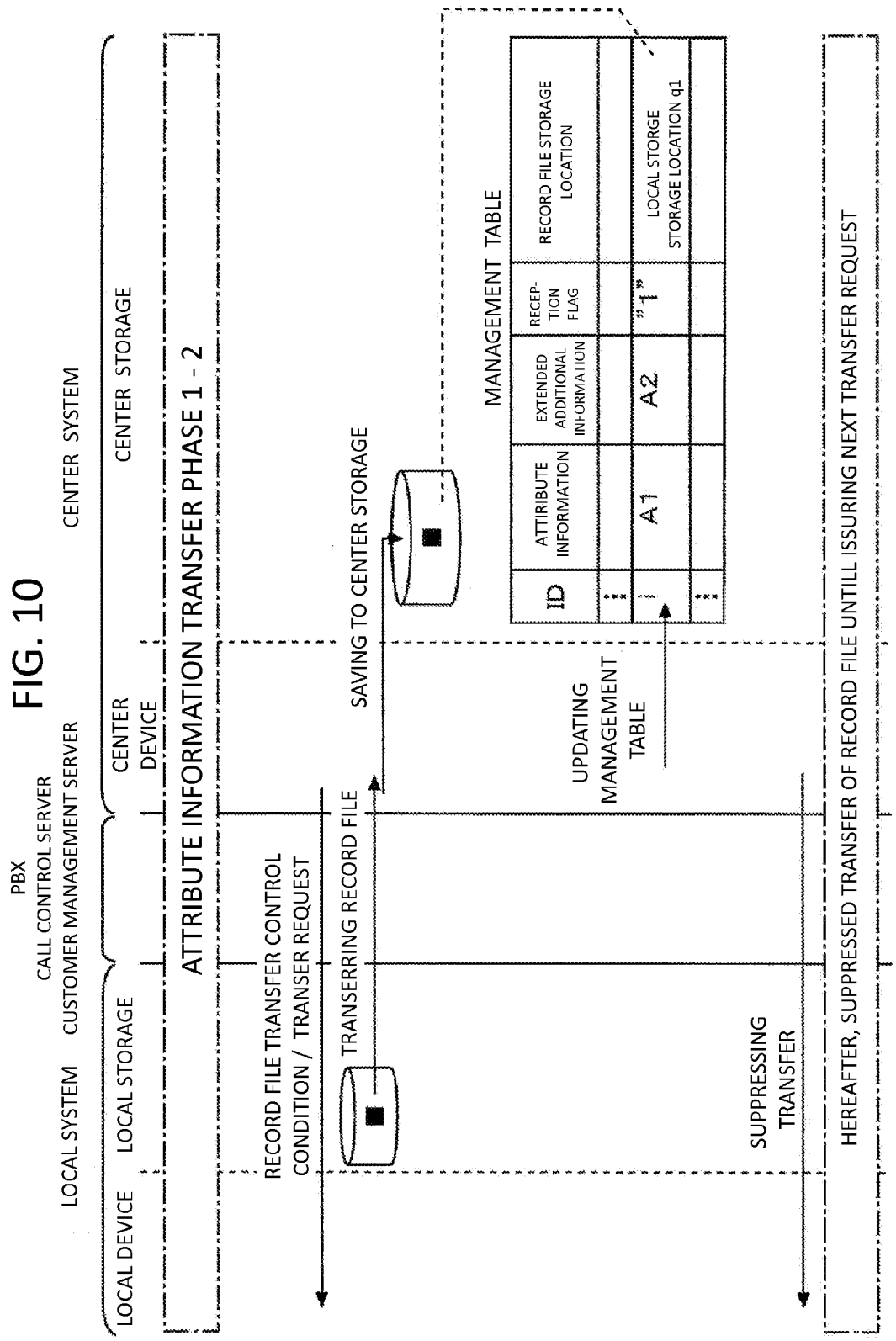
FIG. 10 is a sequence diagram illustrating an example of a series of operations of transferring from a local system to a center system and retaining record files in the third embodiment of the present invention.
Figure 11:
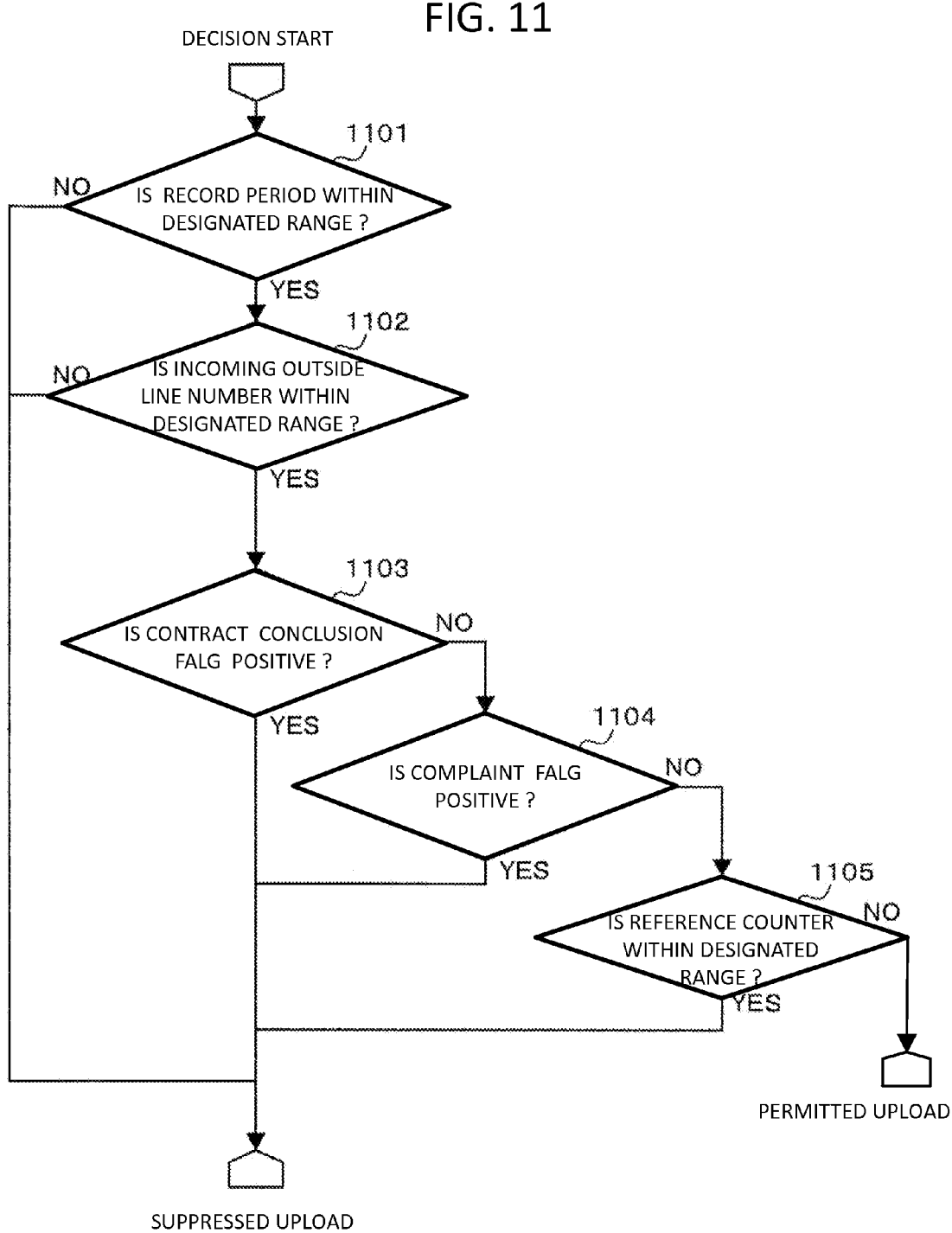
FIG. 11 is a flow chart illustrating an example of a series of operations of transferring from a local system to a center system and retaining record files in the third embodiment of the present invention.

Next, with reference to FIGS. 10-12, we describe the transfer control processing of the record file from the local system to the center system.

First, with reference to FIG. 12, we describe the configuration example of the transfer control condition table 124. The transfer control condition table 124 registers information such as a transfer start time of the record file, a record time of the record file, an incoming outside line telephone number, a contract conclusion flag, a complaint flag, a reference number, and the like. These information are registered by the way that an administrator specifies from the terminal 17. Here, the contract conclusion flag, the complaint flag, the reference number counter are the suppression condition, if at least one of these set conditions is fulfilled, the upload of the record file is suppressed. For one example, we can specify a nighttime zone (for example, "0 a.m.") that the network cost is low for the transfer start time of the record file. Further, we can specify "one week after recording" for the record period of the record file. Incidentally, it is possible that the record period of the record file is not specified. The incoming outside line telephone number is able to be specified a telephone number for a particular service or a telephone number income from a particular area (for example, Tokyo: area code "03-"). Moreover, it is possible that the incoming outside line telephone number is not specified. Although we can set to the contract conclusion flag, or the complaint flag, it is possible that they are not specified. The reference number is the number of count of the reference to the attribute file or record file from the terminal. It is preferable that the record file whose reference number is large than the specific number, is left in the local system, because that means the record file is much more likely to be referred by the administrator, and the record file whose reference number is less than the specific number, is transferred to the center system.

Incidentally, when there are plural local systems, the transfer control condition table 124 is configured corresponding to each of the local systems. At the case, it is preferable that the transfer start time of the record file in the transfer control condition table 124 is specified in the distributed way in the nighttime zone that the network cost is low. For, if plural local systems start to transfer record files at the same time, it is rather capable of occurring the congestion of the actions of storing the record file and updating the attribute information because many receiving of the record file are concentrated in the center system.

Next, with reference to FIGS. 10 and 11, we describe processes of transferring the record file and retention of the record file.

We set the assumption that the record file is kept in the local storage 22, and information of the first attribute information and the second attribute information corresponding to the record file finishes being registered in management table 122.

In FIG. 10, the process of transferring the record file stored in the local storage 22 to the center system 1 starts from the transmission of transfer control condition and transfer request issued from the file transfer control unit 107 in the center device 10. The selection of issuing the transfer request and the record file to be transmitted is performed in accordance with the condition registered in the transfer control condition table 124. In the case of this example, the time that the current time kept in a timer of the center system 1 becomes the record file transfer start time (0 a.m. (time zone: the bandwidth in the network is easy to be reserved)), the record file transfer control unit 107 issues the transfer control condition and transfer request.

Next, as to the example of selection of the record file which is the object of upload based on the transfer control condition, with reference to FIG. 11, we describe in detail.

The aim of this example is that the record file whose reference frequency is large still remains storing in the local storage 22 without transferring to the center system 1, so that the objective record file can be provided in a short time for the request from the terminal 27 in the local system 2. That is, when the objective record file is read immediately from the local storage 22, and transferred to the terminal 27, the transfer time can be reduced substantially, and the line cost can be saved in comparison with the case of transferring the record file stored in the center storage 12. Further, it is unnecessary to transfer (called "upload") the record file to the center system 1.

Next, we describe the process of FIG. 11. First, the transfer control 204 judges whether the record period is within the designated range or not with reference to the information in the management table 122 (S1101). It judges, for example, whether one week passes after the record end time in the attribute information, the record file becomes the object of upload when one week passes (S1101: YES). That is, the important point is as following: the record file remains storing in the local storage 22 (S1101: NO), when one week has not yet passed after recording to the record file (recently recorded), because the reference frequency of the record file rather has a tendency to be large; and to the contrary, when one week has already passed after recording to the record file (old one), the record file is uploaded (S1101: YES) and kept in the center storage 12, because the reference frequency of the record file is reduced.

Next, the transfer control 204 judges whether the incoming outline telephone number indicating the content of reception work is within the designated range or not (S1102). As to the incoming outline telephone number, multiple specification is possible. The incoming outline telephone number is judged with #15 incoming outline telephone number of the attribute information. When the incoming outline telephone number within the designated range, said record file becomes the object of upload.

Next, the record file becomes the object of upload when the attribute is the following: flag negative "0" in the judgment about the contract conclusion flag (S1103); flag negative "0" in the judgment about the complaint flag (S1104); and less than or equal to the designated number (for example, less than or equal to one) in the judgment whether the reference number counter is within the designated range or not (S1105). That is, when the contract conclusion flag or the complaint flag is "1" (positive), or its the reference number counter is more than the designated number, said record file is not uploaded, and is allowed to be easy to use. The transfer control unit 204 in the center system 1 reads the entire record file IDs whose attribute is satisfied with the above mentioned transfer control condition, and transmits them to the local system 2.

When the transfer control unit 204 of the local device 20 receives one or multiple record file IDs transmitted from the center device 10, the transfer control unit 204 reads the record file 92 according with said record file IDs in non-transferred record files stored in the local storage 22 sequentially, and hence, transmits them to the center system 1.

In the center system 1, the record file retention and management unit 102 in the center device 10 receives the transmitted record files sequentially, and stores them to a record file storage area in the center storage 12. For example, when the record file retention and management unit 102 receives the record file whose record file ID is "i" and stores to the record file storage area, the record file retention and management unit 102 transmits to the table management unit 103 the record file ID "i" and the address (center storage location address) "q1" at which the record file is stored. The table management unit 103 rewrites the reception flag #7 corresponding to the record file "i" from not received "0" to already received "1", and rewrites center storage location address to "q1". Hence, the storage destination addresses and reception flags corresponding to the record file ID through all the received record files are changed, and the content of the management table is updated. Consequently, when the center device 10 receives all the record file according with transfer control condition, the record file transfer control unit 107 issues the instruction "transfer suppression" of record files. After that, the condition, transfer suppression is kept until the next transfer request is issued.

<About Local Cash>

In this case, even when the record file is transferred from the local storage 22 to the center system 1, the record file is left to the local storage 22, the local storage 22 is used as what is called "cash" of the center storage 12. The local cash flag for this usage is set to "1", and the local cash storage location address is registered to the address. For example, the local cash storage location address of the record file "i" is "p1" as the same as the previous address. Comparatively a lot access requests such as search or the like is executed from the same local system when the record file is created at the beginning. If we compare the case that the record file stored in the local storage 22 as cash is transferred to the terminal 27 in the same local system 2 and the case that the record file stored in the center storage 10 is transferred to the terminal 27, the network load and cost are low in the former case, therefore, the former case is more effective.

Incidentally, the deletion of the record file stored in the local storage 22 is possible by the instruction from the file transfer control unit 107. For example, the file transfer control unit 107 transmits a cash clear request added the record file ID for the object of deletion, and the local device 20 deletes the record file corresponding to the transmitted record file ID from the local storage 22. After the deletion, the local device 20 notifies the center device 10 of the matter, the table management unit 103 rewrites the local cash flag corresponding to the deleted record file to "0", and deletes said local cash storage location address. It is possible to issue the cash clear request for example, in the way that the file transfer control unit 107 monitors elapsed time from the date and time of acquisition of the record file (for example, record end time), so that the file transfer control unit 107 issues the cash clear request in sequentially to the record file passing for definitely period (for example, one month).

Alternative Example

In the above mentioned third embodiment, the transfer request and transfer control condition are transmitted from the center device 10 to the local system 2. However, according to this alternative example, it is possible that the transfer request is issued first from the local device 20 to the center device 10, the center device 10 refers to the transfer control condition table 123, judges whether transfer is admitted or not (judges whether the transfer start time comes or not), and transfers the transfer request and transfer control condition to the local system.

Further, another alternative example, when the setting condition in the transfer control condition table 124 does not include that of the second attribute information, but includes only that of the first attribute information, this transfer control condition table 124 may be kept in the local storage. In this case, we provide a transfer control condition setting unit 108' in the local device 20, and can set or change the transfer control condition by the transfer control condition setting unit 108' in accordance with the request from the terminal 17 for an administrator at the same as the transfer control condition table 124 in the center storage 12. Incidentally, the issue of the transfer request and the transfer control of the record file is in the same way as the above embodiments, that is, the transfer control unit 204 in the local device 20 reads the record file stored in the local storage 22 in accordance with the condition registered in the transfer control condition table 124' in the local storage 22, and transmits to the center system 1.

Further, in the above embodiments 2 and 3, although the action of phase 3 is performed after the phase 2, according to other alternative embodiment, the action of phase 3 may be performed before the phase 2. According to this, acquisition of the extended added management table for the management table 122 is delayed, however, retention of the record file in the center storage 12 can be advanced. At the result, the terminal 17 in the center system can search the basic information and acquire the record file from the center storage rapidly and in low cost.

Fourth Embodiment

Figure 13:
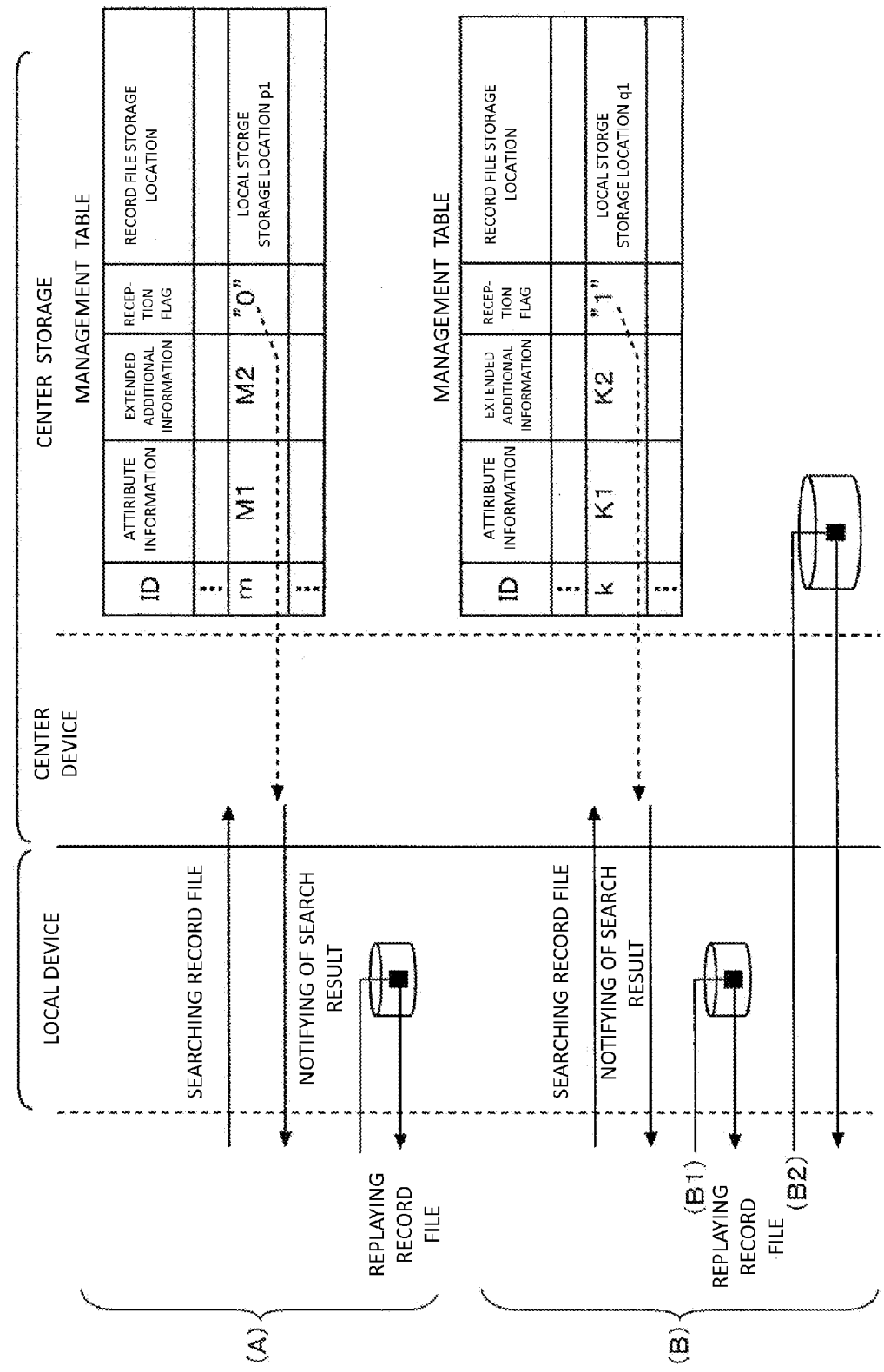
FIG. 13 is a sequence diagram illustrating an example of an operation of searching a record file from a terminal according to the fourth embodiment of the present invention.

Next, with reference to FIGS. 13-15, we describe the search process and reference process.

FIG. 13 (A) illustrates the case that the record file is in the local storage 22, and (B) illustrates the case that the record file is in the center storage 12. Further (B1) illustrates the case that the record file is in both the center storage 12 and the local storage 22 (cash function), and (B2) illustrates the case that the record file is only in the center storage 12.

We assume that an administrator operates an input device of the terminals 7, 17, 27, allows to display the search screen as shown in FIG. 14 in the display screen of a display device, and performs the search of the record file. The search items includes attribute information managed in the management table 122, the first attribute information and the second attribute information (extended additional information). The administrator operates the input device of the terminals, and designates or inputs the content of the item which he desire to search, so that search condition is created. As to the search condition, he can designate the item about the following case: for example, he investigates the condition of listening of a specific operator (operator ID); he listens the record in a specific time zone or received at a specific extension telephone number; he listens the content of complaint from a specific customer (customer name (customer ID)); and the like.

After the administrator inputs (designates) the item about the search condition, when he operates a "search execution" button, the request including the search condition is issued from the terminal. The search request is transmitted to the center device 10 in the center system 1 respectively: when the search request is issued from the terminal 27, it is transmitted through the network connection unit 23 and the WAN 82; when the search request is issued from the terminal 7, it is transmitted through the WAN 82; and when the search request is issued from the terminal 17, it is transmitted through the network connection unit 13.

When the center device 10 receives the search request through the terminal interface 262, the record file reference processing unit 105 searches the management table 122 based on said received search condition. And then, the record file reference processing unit 105 transmits the search result to the terminal of request source through the terminal interface 262.

In the terminal of request source, the search result display screen as shown in FIG. 15 is displayed. Incidentally, the information of the search result transmitted from the center device 10 includes the information not displayed on the display screen. For example, it includes the record file reception flag and the record file storage location address, or the local cash flag and the local cash storage location address.

On the search result screen, "reference flag" and "deletion flag" are displayed in addition to items corresponding to the record file ID accorded with the search condition. The administrator selects the "reference flag" of the record file which he desires to refer (inputs check mark), operates an "execution" button, then the system moves to the process of acquisition the selected record file. As the actions up to this stage, the cases of FIG. 13 (A) and (B) are the same.

As shown in (A), when there is no selected record file in the center storage 12 (record file reception flag "0"), but is in the local storage 22 (the case of the record file ID "m"), the terminal accesses to the local device 20. The access request is accompanied with the address "p1" of the local storage.

When the local storage 20 receives the access request, the local storage 20 reads the record file corresponding to the address "p1", and transmits it to the record file reference processing unit 205. And the record file reference processing unit 205 transmits the record file 92 corresponding to the address "p1" to the terminal of request source.

To the contrary, as shown in (B1), when there is the selected record file in the center storage 12 (the case of the record file ID "k"), the terminal refers further to the local cash flag and the local cash storage location address. In the result, when there is the objective record file in the local storage (local cash flag "0"), the terminal (mainly, terminal 27) issues the access request accompanied with the local cash storage location address "p1" to the local device 20. When the local device 20 receives the access request, the local device 20 reads the record file stored at the local cash storage location address "p1" from the local storage 22, and transmits it to the terminal of request source at the same as the above mentioned actions.

However, as shown in (B2), when there is no selected record file in the local storage (local cash flag "0"), the terminal issues the access request accompanied with the local cash storage location address "q1". In the center device 10, when the record file reference processing unit 105 receives the access request through the terminal interface 262, the record file reference processing unit 105 reads the record file corresponding to the address "q1" from the center storage 12, and transmits the record file to the terminal of request source the terminal interface 262.

As mentioned above, the record file selected by the administrator is transmitted to the terminal of request source from the local storage or the center storage. The administrator can play the record file, and listen to the content.

Although, one or multiple record files created in the local system 2 is collected, kept and managed finally in the center system in accordance with the above mentioned transfer condition, when the local storage works as cash, and the record file is stored also in the local storage 22, the terminal 27 can acquire the objective record file from the local storage in the local system rapidly. As the result, communication cost of the network can be reduced.

Incidentally, in the selection action mentioned above, when the action "deletion" is selected, the deletion request accompanied with the objective record file ID is transmitted from the terminal to the center device 10 or the local device 20. When receiving the deletion request, the record file retention and management unit 102 deletes the record file of the designated record file ID from the center storage, and the transfer control unit 204 deletes the designated record file from the local storage 22.

Fifth Embodiment

The Example of an Image File Management System

Figure 16:
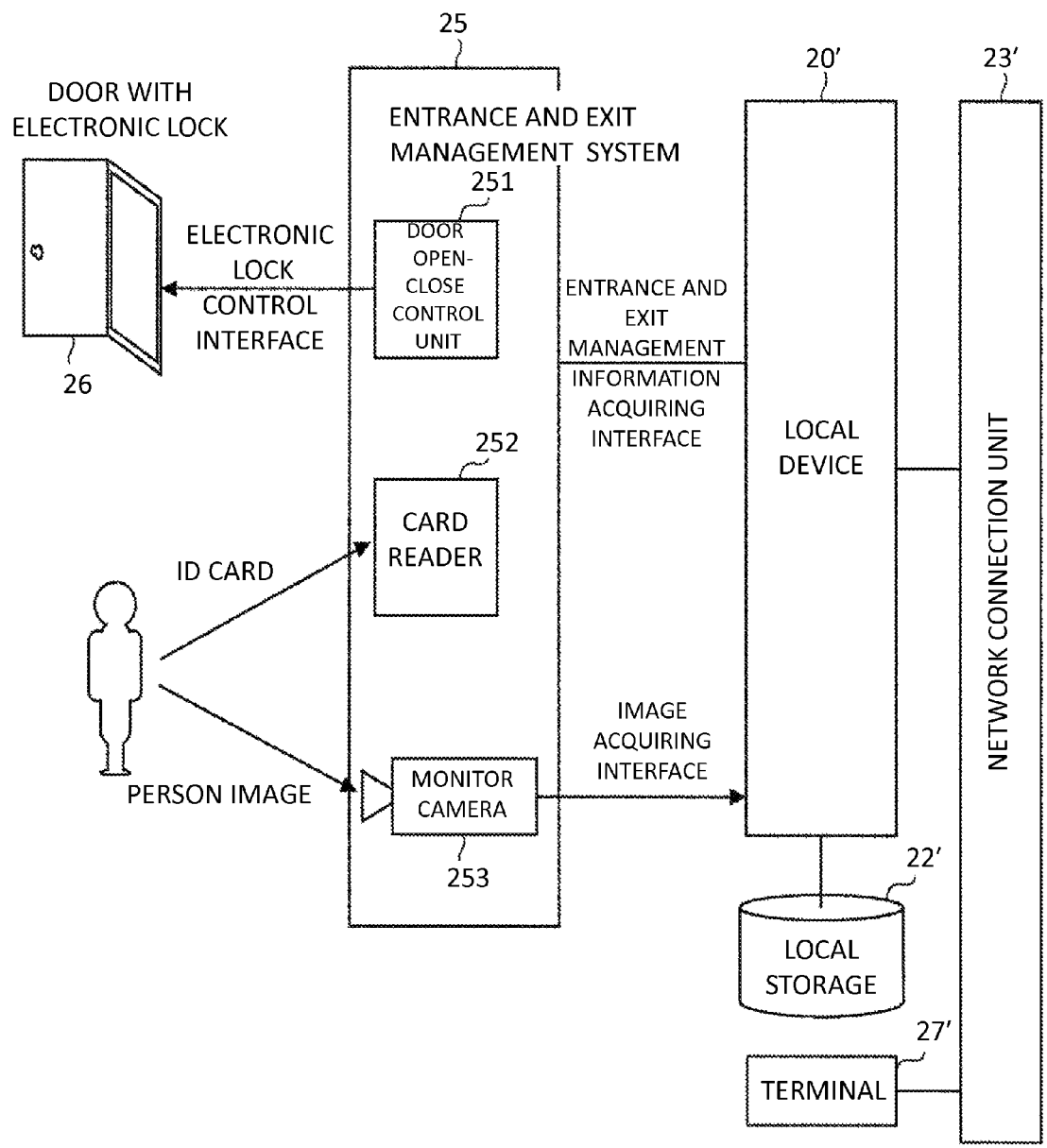
FIG. 16 is a diagram illustrating a configuration example of an image file management system according to the fifth embodiment of the present invention.

FIG. 16 illustrates a configuration example of the local system of an image file management system applied to an entrance and exit management system of an Office or the like.

We can think the local system applied to the call center as to the record file management system is replaced with the local system as the image file management system. Although the basic structure of the center system 1 shown in FIG. 1 does not change, the record file 123 and management table 122 change to the table which manages image files and the attribute information and the related information (added information) thereof.

The entrance and exit management system shown in FIG. 1 comprises an entrance and exit management device 25, a local device 20', a local storage 22', a network connection unit 23', and a terminal 27'. Here, because the configurations and functions of the entrance and exit management device 25, the local device 20', the local storage 22', the network connection unit 23', the terminal 27', and the like are the same as the configurations and functions shown in FIGS. 1 and 2, or we can understand easily from those, we omit those explanation.

The entrance and exit management device 25 is a kind of a server, and has a processor (CPU) which executes programs, and processes data, a memory, a storage device, and the like. The entrance and exit management 25 comprises further a door open-close control unit 251 which controls a door with an electronic lock 26 through an electronic lock control interface, a card reader 252 which reads information of a IC card that a person entering a room has, and a monitor camera 253 to image a face of the person entering a room, or the person itself. In this embodiment, although the image file of the person acquired by the monitor camera 253 is finally transmitted to the center system and managed in the center storage, ahead of these actions, the attribute information of the image file is transmitted to the center system, so that the search of the image file is made possible. When we call "entrance and exit management device 25", it means actions and functions executed by the way that the processor in the entrance and exit management device 25 runs programs.

A person who has an ID card comes to the entrance in the office to which or from which he enters or exits, and allows the ID card to read by the card reader 252 set in the neighborhood of the door. The entrance and exit management device 25 compares the authentication information of ID cards acquired by the card reader 252 with the authentication information of ID cards for the person permitted to enter the room stored in a storage device (not shown in figures), that is, checks their consistency. In the result, when the authentication succeeds, the electronic lock 26 of the door is released by the door open-close control unit 251. Further, when the monitor camera 253 acquires the image of the person allowing the ID card to read by the card reader 252 (the person whose authentication succeeds or not as the result), the entrance and exit management device 25 transmits the image to the local device 20'.

The entrance and exit management device 25 further transmits an authentication time of the ID card, an authentication completion time of the ID card, an authentication result, and the like to the local device 20', at each time when the entrance and exit management device 25 acquires them. In the local device 20', an image file creation unit creates the image file in the way that the image data is converted into electronic file format, gives a specific image file ID to each created image file, and stores in the local storage 20'. Further, an attribute file creation unit create an attribute file composed of information (here, called "basic attribute information") such as an image file ID, an authentication time of the ID card, an authentication completion time of the ID card, an authentication result, and the like, and information (here, called "basic added information") such as a door ID to identify with the door issuing an request to be opened, an ID card number to identify with the IC card, an authentication result indicating whether the authentication succeeds or not, and the like, and transmits the attribute file to a center system 1'.

Further, as an alternative example of the configuration, it is possible the server device, the entrance and exit management device 25 has some functions which deal with the image file kept in the local device 20' as parts of its functions.

FIG. 17 illustrates a configuration example of an attribute information management table to manage attribute information of image files.

The management table 122' kept in the center storage 12' of the center system 1' is composed of the basic information as to an image file acquired by the monitor camera and the information of acquisition for the image file, and the added information as to not the image file itself, but rather the person generating the image file (image of the body) or items (ID card) which the person possesses. The added information is composed further of the basic added information and the extended additional information.

The basic added information includes an ID to identify with the image file, a record start time indicating a time at which the monitor camera starts to record, similarly a record end time indicating a time at which the monitor camera finishes to record, a record time, an authentication start time to start to authenticate for the entrance of a person having the ID card, similarly an authentication end time to finish to authenticate, a storage location address indicating a location at which the local storage or the center storage stores the image file, a reception flag indicating that the center storage receives the image file, a local cash flag indicating that the image file is stored in the local storage 22', receives, a cash location address used when the image file is stored as cash in the local storage, and the like.

The extended additional information includes a door ID to identify with the door issuing an request to be opened, an ID card number to identify with the IC card, an authentication result indicating whether the authentication succeeds or not, and the like. Further, the extended additional information includes a reference counter indicating a cumulative number at which the ID card user name or its attribute information is referred, and the like. As to the attribute information, the ID card user name (personal information of the card user) and the like, after the center device acquires the basic added information and the extended additional information of the image file, and stores it in the management table, the center device acquires the attribute information as the personal information of the person having the ID card from a personnel management server (not shown in figures) connected to the center device.

Because, in the image file management system configured as the above mentioned, a transfer control of the image file from the local system 2' to the center system, a search for the image file and its attribute information using the image file management system are the same as the first embodiment, we omit explanation of these matters.

According to this embodiment, the fifth embodiment, we can get the same effect as the first embodiment such that the transfer time zone of the image file is set to the time zone in which reservation of the network bandwidth is easy and so forth. Further according to the entrance and exit management system, early treatment for security is possible by the way that the system gives high priority to transmission of the image file of the person who does not succeed in his authentication. Moreover, the customer service can be reinforced by the way that the system gives high priority to transmission of the attribute file of the outside persons such as customers or the like.

Incidentally, as the alternative example of the fifth embodiment, it is possible to use the camera acquiring the image of the finger print or the vain of the person who enter from or exit to the door, instead of the monitor camera 253 imaging the person's body. Also in this case, surely we can get the same effect as the fifth embodiment.

Moreover, as another example, this invention can be applied to the system comprising a monitor camera set to interchange gates in highways and an ETC device. The monitor camera acquiring the image of a car or a driver acquires the image and its attribute information (the first information), and the ETC device acquires personal information (corresponding to the second information), so that the attribute information and the image file can be transferred to a center and managed.

We can present various alternative examples of the above mentioned embodiments 1-5.

For example, in the above embodiments, although the management table 122 and the record file are stored in the same storage, it is not always necessary to store in the same storage. The management table 122 can be stored in the store device such as a semiconductor memory the memory set in the server, whose storage capacity is comparatively smaller, while the record file can be stored in the mass capacity storage. Further, we mentioned the contact center management system that a record file generated in the call center is transmitted to the center system, and managed in the center system. Here, it is not always necessary that the center system is a host computer specified in advance or something. According to an application, the center system may be, for example, a server or computer which is specified by a user or a company entrusted operations in the call enter.

Further, in the above embodiment, although we call a record voice file or image file "record file" generically, various ways of calling are possible. For example, it may be called a record log of a voice, image, or video, further, it may be called "a contents file of a voice", or "a contents file of image".

According to the some embodiments mentioned above, first, the attribute information of the record file created in a local base point is transmitted to the center device, and managed as a management information, after that, the center device acquires the record file. We can set transfer control conditions in various ways to transmit the record file stored in a storage set in the local point to the center system, so that various types of transfer control are possible. For example, as to the time at which the record file is transmitted, we can set to the time zone such as a night time zone or the like, in which the bandwidth is easy to reserve, so that the necessary network bandwidth can be reduced, and the line cost can be decreased.

Further, we can search the record file in wide and various view points by the way that the system manages not only the attribute information acquired from a device set in a local point, but also the attribute information acquired from another device as management information, and searches the latter attribute information.

Furthermore, the search for and reference to the record file is easy from the terminal 27, because the record file is stored at a certain period in the local storage 22. In the case of the call center, there are needs that an administrator or operator wishes to listen once more to the content of the record of call occurring in the same place, and these needs can be satisfied.

In this case, time for playback of the record file can be reduced, because download of the record file from a center through a WAN is not necessary in the reason that the record file saved as cash in the local storage 22 is read directly from the terminal 27 in the local base point.

Further, concentration management of record of telephone calls is possible while we ensure security of the record file, because for the user who wishes to leave the record file in the viewpoint of security, without transmission of the record file to a center, only the attribute file can be transmitted to the center, and managed.

What is claimed is:

1. A file management system, comprising a first device and a second device, wherein the file management system, that:
   transmits a record file, created by the first device, to the second device over a network, the record file including at least one of voice data and image data;
   manages the record file in the second device; and
   refers the record file according to a request from a terminal;
   wherein the first device:
   creates the record file,
   creates attribute information indicating an attribute of the record file, the attribute information including identification information of the record file, stores the record file and identification information identifying the record file in a first storage unit, and transmits the record file and attribute information to the second device through the network;

wherein the second device is configured to:
receives the record file and attribute information transmitted from the first device through the network,
stores management information, the management information including the attribute information in a second storage unit,
stores the record file in the second storage unit, and
transmits the attribute information of the management information to a terminal according to an acquisition request from the terminal;

wherein the terminal is configured to transmit the acquisition request to acquire the record file, based on acquired attribute information, to the second device; and wherein the second device which received the acquisition request, reads the record file from the second storage unit, and transmits the read record file to the terminal.

2. The file management system of claim 1,
wherein the first device comprises:
a record file creation unit that creates the record file;
an attribute file creation unit that creates an attribute file that includes:
the attribute information indicating the attribute of the record file and
the identification information of the record file,
the first storage unit that stores the record file under a condition that the record file is associated with the identification information, and
a transfer control unit that controls transfer of the record file and the attribute file to the second device;
wherein the second device comprises:
an attribute processing unit that acquires the attribute information of the attribute file,
a management unit that creates the management information that includes the attribute information processed by the attribute processing unit,
the second storage unit that stores the management information created by the management unit and the record file transmitted by the first device through the network; and
a reference processing unit that searches the management information stored in the second storage unit according to the request from the terminal, and transmits the attribute information related to the management information to the terminal; and
wherein the terminal displays information acquired from the management information searched by the reference processing unit on a display device, and transmits to the second device the acquisition request to acquire the record file corresponding to the attribute information selected by an input device among a plurality of attribute information displayed on the display device.

3. The file management system of claim 2,
wherein the second storage unit stores a management table managing the management information that includes:
the identification information that identifies the record file corresponding to the acquired attribute information,
an address that specifies a storage location in the second first storage unit in which the record file is stored, and
a reception flag indicating whether the record file is received; and
wherein the management unit registers to the management table the identification information, and the address acquired from the attribute information.

4. The file management system of claim 3,
wherein the management information comprises a local cash flag, corresponding to the record file, indicating whether the record file transmitted to the second device is stored in the first storage unit; and
wherein when the terminal refers to the local cash flag associated with the selected attribute information, and the local cash flag indicates the record file is stored in the first storage unit, the terminal transmits the acquisition request for the record file to the first device.

5. The file management system of claim 3,
wherein the terminal displays a search screen of a plurality of items that includes the attribute information of the management information on the display device,
wherein the input device of the terminal selects at least one of the plurality of items of the search screen,
wherein the terminal transmits a search request for the selected items to the first device,
wherein the reference processing unit searches the management table for the selected items according to the search request, and transmits a search result to the terminal,
wherein the display device in the terminal displays the search result, and
wherein the input device in the terminal selects at least one item of the search result displayed on the display device.

6. The file management system of claim 5,
wherein the terminal transmits the acquisition request to the first device when the record file of an object of the acquisition request is stored in the second storage unit of the second device, and when the local cash flag indicates the record file of the object for the acquisition request is stored in the first storage unit.

7. The file management system of claim 1,
wherein the first device is communicatively connected to a telephone system for reception and response of telephone communication through a public telephone network, and
wherein the first device creates the record file generated in the telephone system and the attribute information related to the record file as the record file and the attribute information, respectively.

8. The file management system of claim 1,
wherein the record file stored in the first storage unit is transferred to the terminal according to the acquisition request from the terminal connected to the first device, and
wherein the record file is stored in the first storage unit after the record file is transmitted from the first device to the second device.

9. The file management system of claim 1, wherein the second device:
acquires a first attribute information as the attribute information acquired from the first device and a second attribute information related to the first attribute information from another device different from the first device, and
stores the first attribute information and the second attribute information in the second storage unit in response to the first attribute information and the second attribute information corresponding and is included in the management information.

10. A file management method, comprising:
transmitting a record file, created by a first device, to a second device over a network, the record file including at least one of voice data and image data;
managing the record file in the second device; and
referring the record file according to a request from a terminal;
wherein the first device:
    creates the record file,
    creates attribute information indicating an attribute of the record file, the attribute information including identification information of the record file,
    stores the record file and identification information identifying the record file in a first storage unit, and
    transmits the record file and attribute information to the second device through the network;
wherein the second device is configured to:
    receives the record file and attribute information transmitted from the first device through the network,
    stores management information, the management information including the attribute information in a second storage unit,
    stores the record file in the second storage unit, and
    transmits the attribute information of the management information to a terminal according to an acquisition request from the terminal;
wherein the terminal is configured to transmit the acquisition request to acquire the record file, based on acquired attribute information, to the second device; and
wherein the second device which received the acquisition request, reads the record file from the second storage unit, and transmits the read record file to the terminal.

11. The file management method of claim 10,
wherein the first device is communicatively connected to a telephone system for reception and response of telephone communication through a public telephone network, and creates a record voice file generated in the telephone system and the attribute information related to the record voice file as the record file and the attribute information related to the record file;
wherein the second device stores in the second storage unit attribute information including:
    identification ID that identifies the record file,
    a record start time that indicates a start time of a recording of the telephone call with a caller through the telephone system,
    a record finish time that indicates a finish time of the recording,
    a record time,
    a source IP address and the destination IP address of the record file,
    a call source telephone number,
    a call destination telephone number,
    a caller outside line telephone number,
    an incoming telephone number, an extension telephone number,
    an operator id that identifies an operator of the telephone system,
    a customer identification information uniquely given to each customer of a service company whose business is dealing with customers,
    a contract conclusion flag indicating a content of the telephone call is a conclusion of a contract with a customer, and
    a complaint flag indicating a content of a customer's call is a complaint; and
wherein the terminal searches the attribute information, and transmits the acquisition request for the record file according to a search result to the second device.

12. A file management method, comprising:
creating a record file that includes at least one of voice data and image data in a first device;
creating an attribute file that includes attribute information including identification information associated with the record file in the first device;
storing the record file associated with the identification information in a first storage unit of the first device;
transmitting the attribute file from the first device to a second device through a network;
transmitting the record file from the first device to the second device through the network;
creating management information that includes the attribute information acquired from the attribute file transmitted from the first device through the network;
storing in a second storage unit in the second device the management information and the record file; and
searching the management information stored in the second storage unit according to an acquisition request from a terminal connected to the second device and transmitting the attribute information related to the management information to the terminal;
displaying the attribute information on a display device of the terminal and transmitting the acquisition request for acquiring the record file corresponding to at least one attribute information selected by an input device among a plurality of attribute information displayed on the display device, to the second device;
reading out the record file stored in the second storage unit, according to the acquisition request transmitted from the terminal, and
transmitting the record file read out to the terminal.

13. A file management method, comprising:
transmitting a record file, created by a first device, to a second device over a network, the record file including at least one of voice data and image data;
managing the record file in the second device; and
referring the record file according to a request from a terminal;
wherein the first device:
    creates the record file,
    creates attribute information indicating an attribute of the record file, the attribute information including identification information of the record file,
    stores the record file and identification information identifying the record file in a first storage unit, and
    transmits the record file and attribute information to the second device through the network;
wherein the second device is configured to:
    receives the record file and attribute information transmitted from the first device through the network,
    stores management information, the management information including the attribute information in a second storage unit,
    stores the record file in the second storage unit, and
    transmits the attribute information of the management information to a terminal according to an acquisition request from the terminal;

wherein the terminal is configured to transmit the acquisition request to acquire the record file, based on acquired attribute information, to the first device; and wherein the first device which received the acquisition request, reads the record file from the first storage unit, and transmits the read record file to the terminal.

* * * * *